March 27, 1934.   W. L. HANSEN   1,952,498
ELECTRIC MOTOR
Filed May 27, 1932   2 Sheets-Sheet 2

INVENTOR
William L. Hansen
BY
Toulmin & Toulmin
ATTORNEYS

Patented Mar. 27, 1934

1,952,498

UNITED STATES PATENT OFFICE 1,952,498

ELECTRIC MOTOR

William L. Hansen, Princeton, Ind., assignor to Hansen Mfg. Company, Princeton, Ind., a corporation of Indiana Application May 27, 1932, Serial No. 613,949

4 Claims. (Cl. 172—278)

This invention relates to improvements in electric motors, and particularly to self-starting, synchronous motors adapted to be used in connection with clocks.

It is particularly the object of this invention to provide, in connection with a motor of this kind, a plurality of field poles so arranged with relation to each other and so magnetized that opposite poles are closely adjacent each other, and provide a rotating field about a rotor located within and surrounded by the poles. The rotor is located within the poles so that its distance from the poles is greater than the distance between adjacent oppositely magnetized poles.

These and other objects and advantages will appear from the following description taken in connection with the drawings.

Referring to the drawings.

Figure 1:
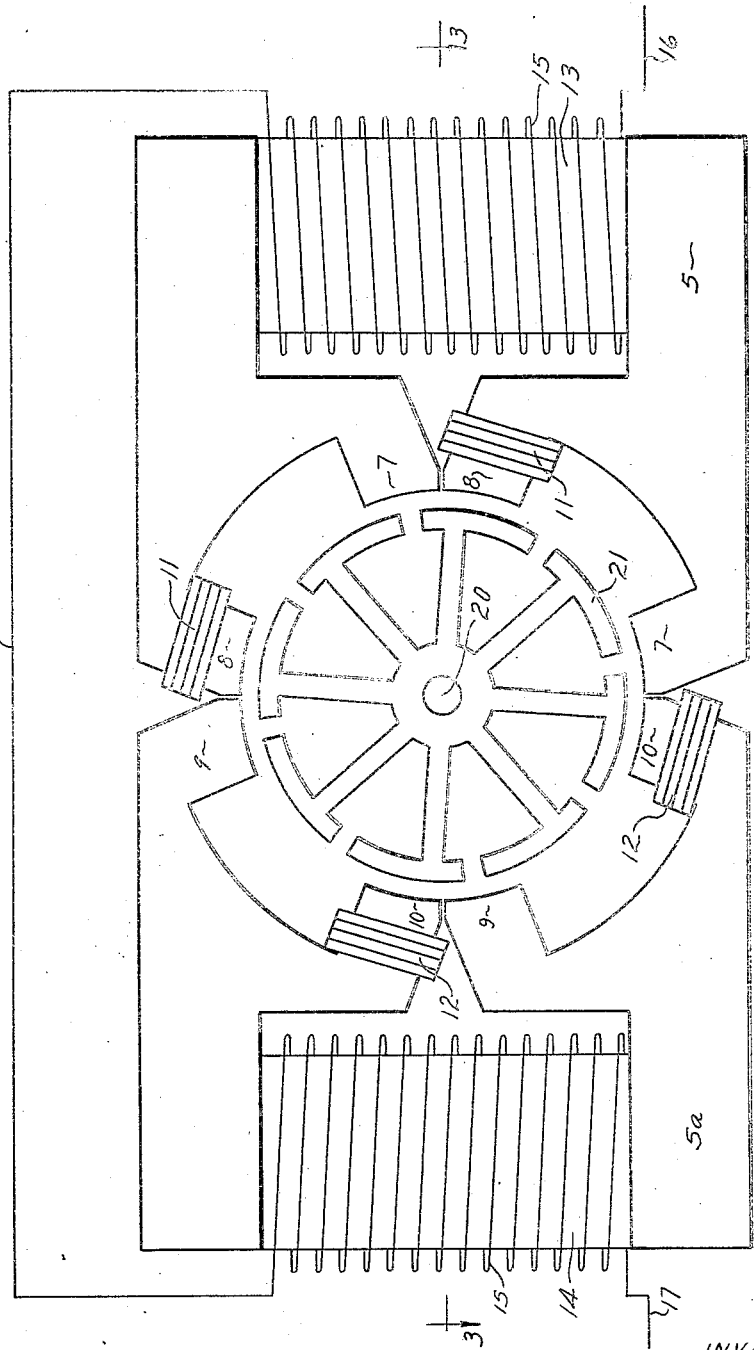
Figure 1 shows diagrammatically a side elevation of a motor constructed according to the present invention.
Figure 2:
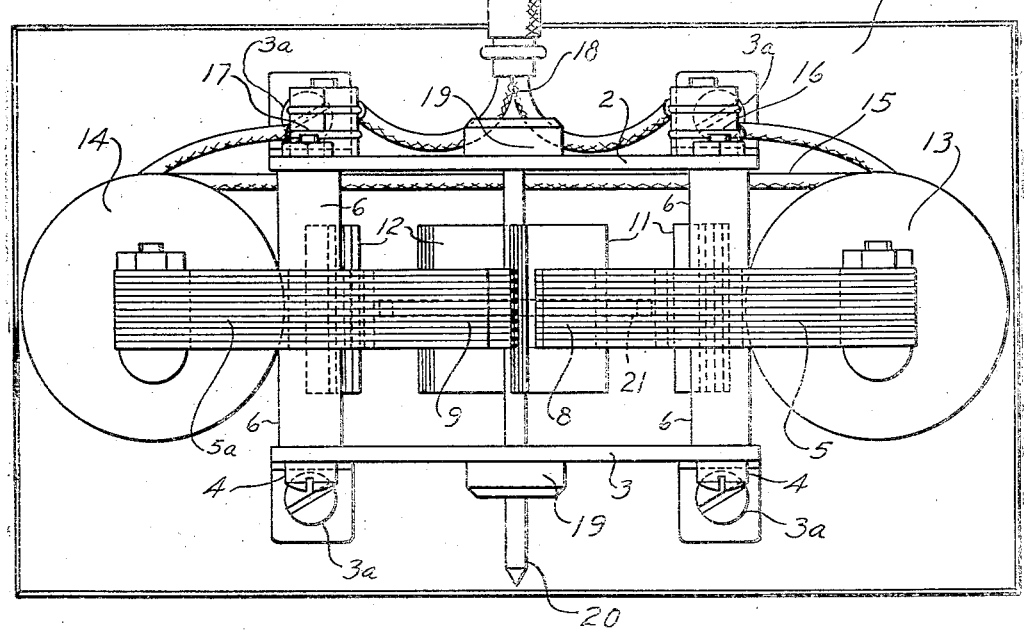
Figure 2 is a top plan view of the motor.
Figure 3:
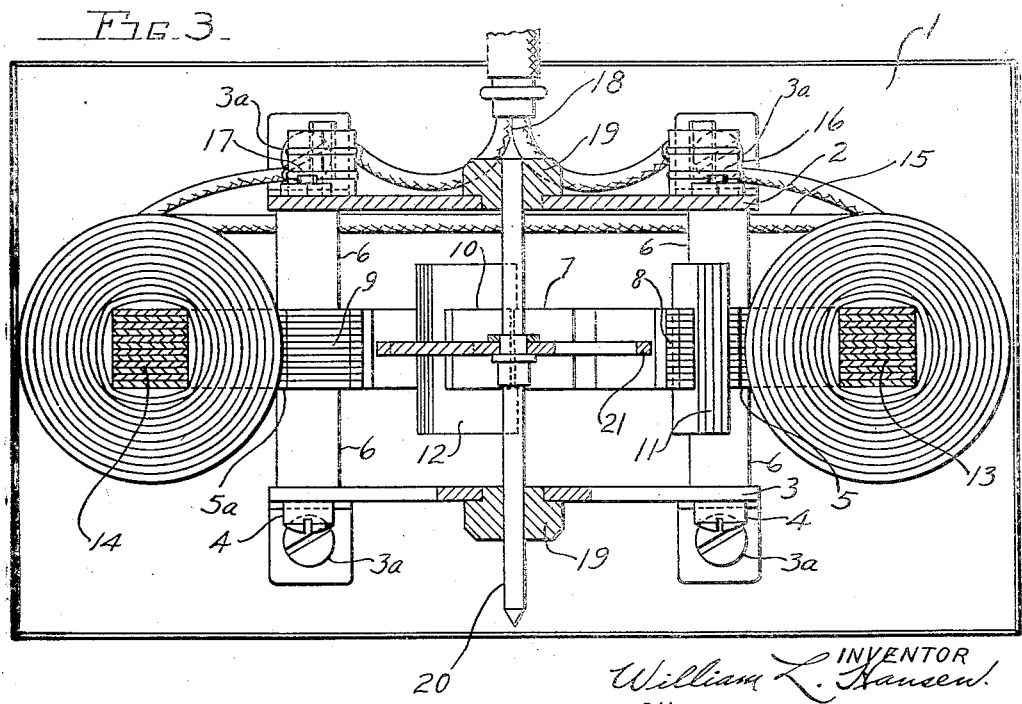
Figure 3 is a horizontal section through the motor on the line 3—3 of Figure 1.

The motor of the present application is adapted to be used in connection with clocks, and for that purpose there is provided a panel support 1, to one side of which the motor is attached. For supporting the mechanism of the motor there is provided a back plate 2 and a front plate 3, attached to the panel by means of screws 3a. These plates are spaced from each other and connected by means of bolts 4 passing through both plates. These bolts also pass through a pair of bi-polar field magnets 5 and 5a, which are held in spaced relationship with regard to the plates by means of sleeves 6 on the bolts 4, between the magnets and the plates. These bi-polar field magnets constitute the stator.

Each pole of the field magnet 5 is divided into two branches 7 and 8, while the field magnet 5a is divided into two branches 9 and 10. One of each of the branches 9 and 10 of the field magnet 5a is closely adjacent one of each of the branches 8 and 7 of the field magnet 5. The other branches 7 and 8 of the field magnet 5 are closely adjacent each other, while the other branches 9 and 10 of the field magnet 5a are closely adjacent each other. The spaces between the shaded and the unshaded pole bifurcations of like polarity are approximately equal in width to the combined width of the shaded and the unshaded pole bifurcations.

Around each of the branches 8 of the field magnet 5 there is a plurality of coils 11, which form shading coils that serve to retard the magnetic flux in these branches. Similar shading coils 12 are provided in connection with the branches 10 of the bi-polar field 5a. In connection with the bi-polar magnetic field 5 there is a core 13 and a similar core 14 is provided in connection with the bi-polar field 5a.

Around these cores a coil of insulated wire 15 is wound. This insulated wire is so wound around the coils that the adjacent branches of the poles are oppositely magnetized. There is a considerable amount of leakage of the magnetic flux between adjacent poles, which tends to set up a counter-electro-motive force, which will retard the flow of the electric current in the energizing coils. Hence these coils require a less number of convolutions.

The wire 15 is attached at one end to a binding post 16, while its other end is attached to a binding post 17. Extending from each binding post is a lead 18 for the purpose of conducting an alternating electric current through the wires and to the coils for energizing the coils and magnetizing the magnets.

In each plate 2 and 3 is a bearing 19 which supports a shaft 20 for rotation. On this shaft, between the bearings and in the space between the poles, there is a rotor 21. This rotor is circular in shape and is so positioned within the space between the poles that the space between the periphery of the rotor and each pole is greater than the distance between adjacent oppositely magnetized parts of the poles.

By placing the polar projections of opposite polarity closer together than the space between said polar projections and the rotor, there is created a counter-electro-motive force in the magnetic coils, which reduces the current consumption materially. In other words, by the construction here set out coils of less convolutions and hence less resistance may be employed since the flow of current through such a coil will be automatically retarded by a counter-electro-motive force created by partial shortcircuiting of the magnetic flux between the stator polar projections of opposite polarity.

It will be understood that it is desired to comprehend within this invention such modifications as come within the scope of the claims and the invention.

Having thus fully described this invention, what is claimed as new and desired to be secured by Letters Patent, is:

1. In a motor, a pair of bi-polar field magnets so arranged that the negative pole of one magnet is adjacent the positive pole of the other magnet and the poles of each magnet are adjacent each other, each pole being formed into two remotely spaced branches, a shading coil around one branch of each pole, said coil being on a branch adjacent an oppositely magnetized branch, and a rotor surrounded by the poles.

2. In a motor, a pair of bi-polar field magnets so arranged that the negative pole of one magnet is adjacent the positive pole of the other magnet and the poles of each magnet are adjacent each other, each pole being formed into two remotely spaced branches, a shading coil around one branch of each pole, said coil being on a branch adjacent an oppositely magnetized branch, a rotor surrounded by the poles, and means for creating an alternating magnetic flux in the poles.

3. A self-starting synchronous motor having fields with bifurcated poles, one of these bifurcations being shaded and the other being unshaded, in which the spaces between the shaded and the unshaded pole bifurcations of like polarity are approximately equal in width to the combined width of the shaded and unshaded pole bifurcations.

4. A self-starting synchronous motor having fields with four bifurcated poles, one bifurcation of each pole being shaded and the other unshaded, with the space between the shaded and the unshaded bifurcations of like polarity being approximately equal in width to the combined width of the shaded and the unshaded bifurcations.

WILLIAM L. HANSEN.